(12) United States Patent
Gao et al.

(10) Patent No.: US 12,352,333 B2
(45) Date of Patent: Jul. 8, 2025

(54) TOOTHED POWER TRANSMISSION BELT WITH BACK FABRIC

(71) Applicant: Gates Corporation, Denver, CO (US)

(72) Inventors: Min Gao, Jiangsu (CN); Nigel Peter Blunsden, Dumfries (GB); Guogong Chen, Kunshan (CN); Shawn Xiang Wu, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 18/408,302

(22) Filed: Jan. 9, 2024

(65) Prior Publication Data
US 2024/0151293 A1   May 9, 2024

Related U.S. Application Data

(63) Continuation of application No. 17/197,876, filed on Mar. 10, 2021, now abandoned, which is a continuation of application No. 15/841,186, filed on Dec. 13, 2017, now abandoned.

(51) Int. Cl.
| | |
|---|---|
| *F16G 1/28* | (2006.01) |
| *B29D 29/08* | (2006.01) |
| *F16G 1/10* | (2006.01) |
| *F16G 5/08* | (2006.01) |
| *F16G 5/20* | (2006.01) |

(52) U.S. Cl.
CPC ............... *F16G 1/28* (2013.01); *B29D 29/08* (2013.01); *F16G 1/10* (2013.01); *F16G 5/08* (2013.01); *F16G 5/20* (2013.01)

(58) Field of Classification Search
CPC ..... F16G 5/00; F16G 5/04; F16G 5/06; F16G 5/08; F16G 5/20; F16G 1/00; F16G 1/04; F16G 1/06; F16G 1/08; F16G 1/10; F16G 1/28; B29D 29/00; B29D 29/08; B29D 29/085; B29D 29/10; B29D 29/103; B29D 29/106
See application file for complete search history.

(56) References Cited

U.S. PATENT DOCUMENTS

| | | | | |
|---|---|---|---|---|
| 3,853,017 | A * | 12/1974 | White, Jr. | F16G 1/08 474/271 |
| 5,645,504 | A * | 7/1997 | Westhoff | F16G 1/28 474/271 |
| 5,776,026 | A * | 7/1998 | Tajima | B29D 29/08 474/271 |
| 6,572,505 | B1 * | 6/2003 | Knutson | F16G 5/08 474/263 |
| 6,595,883 | B1 * | 7/2003 | Breed | F16G 5/06 156/137 |
| 6,632,151 | B1 * | 10/2003 | Knutson | B29D 29/08 156/137 |
| 6,863,761 | B2 * | 3/2005 | Knutson | F16G 1/10 156/137 |

(Continued)

*Primary Examiner* — Henry Y Liu
*Assistant Examiner* — Raveen J Dias
(74) *Attorney, Agent, or Firm* — Kevin J. Aiken, Esq.

(57) ABSTRACT

A toothed power transmission belt with a smooth back side surface has a back jacket on the back side surface; wherein the back jacket comprises a closed-mesh, knit fabric tube. The fabric tube may be knitted on a circular weft knitting machine and may be heat set after knitting. The fabric tube may be treated with an epoxy, RFL or other treatment to provide for oil resistance, adhesion, frictional properties, etc.

4 Claims, 2 Drawing Sheets

(56) References Cited

U.S. PATENT DOCUMENTS

| Patent/Pub No. | Date | Inventor | Classification |
|---|---|---|---|
| 6,945,892 B2* | 9/2005 | Knutson | F16G 5/08 156/137 |
| 7,182,826 B2* | 2/2007 | Knutson | B29D 29/08 156/137 |
| 8,932,165 B2* | 1/2015 | Knox | F16G 1/28 474/204 |
| 9,617,077 B2* | 4/2017 | Shoji | F16G 1/04 |
| 2003/0073533 A1* | 4/2003 | Knutson | F16G 5/08 474/263 |
| 2003/0078125 A1* | 4/2003 | Knutson | F16G 1/10 474/263 |
| 2004/0048709 A1* | 3/2004 | Knutson | F16G 5/20 474/263 |
| 2004/0217519 A1* | 11/2004 | Tagawa | B29C 48/022 156/137 |
| 2007/0249451 A1* | 10/2007 | Wu | F16G 1/28 474/263 |
| 2010/0167860 A1* | 7/2010 | Mori | D03D 15/49 474/252 |
| 2010/0197435 A1* | 8/2010 | Gewald | F16G 1/28 474/263 |
| 2014/0080647 A1* | 3/2014 | Sakamoto | F16G 1/28 474/205 |
| 2015/0246776 A1* | 9/2015 | Shoji | B65H 5/02 474/267 |
| 2016/0053851 A1* | 2/2016 | Kojima | F16G 5/08 474/265 |
| 2016/0208889 A1* | 7/2016 | Yoshida | B32B 5/02 |
| 2017/0009847 A1* | 1/2017 | Mitsutomi | D04B 21/20 |
| 2017/0284504 A1* | 10/2017 | Mitsutomi | F16G 5/08 |
| 2017/0312939 A1* | 11/2017 | Lofgren | C08J 5/042 |
| 2018/0036975 A1* | 2/2018 | Yoshida | F16G 1/28 |
| 2019/0030844 A1* | 1/2019 | Harushige | B29D 29/10 |
| 2019/0030845 A1* | 1/2019 | Hata | F16G 5/06 |
| 2019/0085938 A1* | 3/2019 | Yoshida | B62D 5/0424 |
| 2019/0178338 A1* | 6/2019 | Gao | D03D 1/0041 |
| 2019/0178339 A1* | 6/2019 | Gao | F16G 1/28 |
| 2020/0362941 A1* | 11/2020 | Takechi | B32B 25/10 |

* cited by examiner

TOOTHED POWER TRANSMISSION BELT WITH BACK FABRIC

BACKGROUND OF THE INVENTION

This invention relates generally to toothed power transmission belts with fabric on the smooth, back side; more particularly with a closed-mesh, tubular, back fabric, circular-knitted with polyurethane and nylon yarns, heat set, and having an epoxy-based treatment, and particularly suitable for use in an oil-wet environment.

Toothed power transmission belts are used to transmit mechanical power and motion between two or more shafts. The teeth mesh with corresponding grooves on sprockets or pulleys, resulting in synchronized motion and torque transfer. The typical timing belt construction includes a high-modulus tensile cord embedded in a rubber belt body, with regular, transverse teeth on one side, the toothed side, of the belt and a smooth surface on the back side of the belt. Representative of the art is U.S. Pat. No. 6,358,171 B1 to Whitfield. There is typically a woven fabric covering the toothed surface of the belt. The tooth covering fabric is typically rubberized or treated with an adhesion promoter such as an RFL. Whitfield also addresses the need for low temperature performance. Further improvements in low-temperature performance of automotive timing belts would be beneficial.

Toothed power transmission belts are typically used in a dry environment, without lubrication. Use in an oil-wet environment, such as within the crankcase of an internal combustion engine, presents significant challenges in heat resistance, oil resistance, wear resistance, durability, and load capacity. Representative of the art is U.S. Pat. Pub. No. 2014/0080647 A1 to Sakamoto et al., which discloses epoxy and epoxy-latex treatments for a woven tooth covering fabric for use in an oil or water environment. Further improvements in oil-wet performance would be beneficial.

Less common in the art is use of a fabric on the smooth, back side of a toothed belt. Representative of the art are U.S. Pat. Nos. 6,572,505 B1, 6,632,151 B1 and 6,863,761 B2 to Knutson, which disclose an outer seamless tubular knit textile material with relatively open weave structure selected to allow permeation of an underlying rubber layer through interstices in the textile material. U.S. Pat. No. 8,568,260 B2 to Baldovino et al. discloses toothed belt constructions with woven tooth fabric and resistant coating layer, optionally also on the back side of the belt, for use with oil.

SUMMARY

The present invention is directed to systems and methods which provide toothed power transmission belts with fabric on the smooth, back side, more particularly with a closed-mesh, knit, back fabric, circular knitted with polyurethane and nylon yarns, heat-set and preferably with a treatment such as an epoxy or RFL treatment. The resulting belt is particularly intended for use in an oil-wet environment or for good low-temperature durability, e.g., in an automotive engine timing drive.

The invention relates to a toothed power transmission belt with a rubber belt body with a toothed surface on one side thereof and a smooth back side surface opposite the toothed side; a tooth jacket covering the toothed surface; a tensile cord embedded in the belt body; and a back jacket on the back side surface; wherein the back jacket includes a closed-mesh, knit fabric tube. The fabric tube may be knitted with an elastic yarn and an inelastic yarn, which may both be fed separately into a circular, weft-knitting machine. The elastic yarn may include polyurethane and the inelastic yarn may include nylon. The back jacket may have a fabric coating that may be RFL-type or an epoxy-based coating. The coating may include an epoxy and a latex rubber.

The invention is also directed to a method of making the toothed power transmission belt described above, including the steps of providing the closed-mesh, knit fabric tube, treating the knit fabric tube with a coating to make the back jacket, applying the back jacket to a belt slab on a belt-building mandrel, curing the belt slab and cutting to a desired width, resulting in a toothed power transmission belt.

The treating may include drying the coated fabric in a stress-free process, such as drying the coated fabric on a carrier fabric. The method may include heat setting the knit fabric tube.

The invention also relates to a method of using the toothed power transmission belt including installation of the belt on a belt drive, which may be in an oil-wet environment. The drive may be an automotive timing drive and it may use the belt in an oil-wet environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
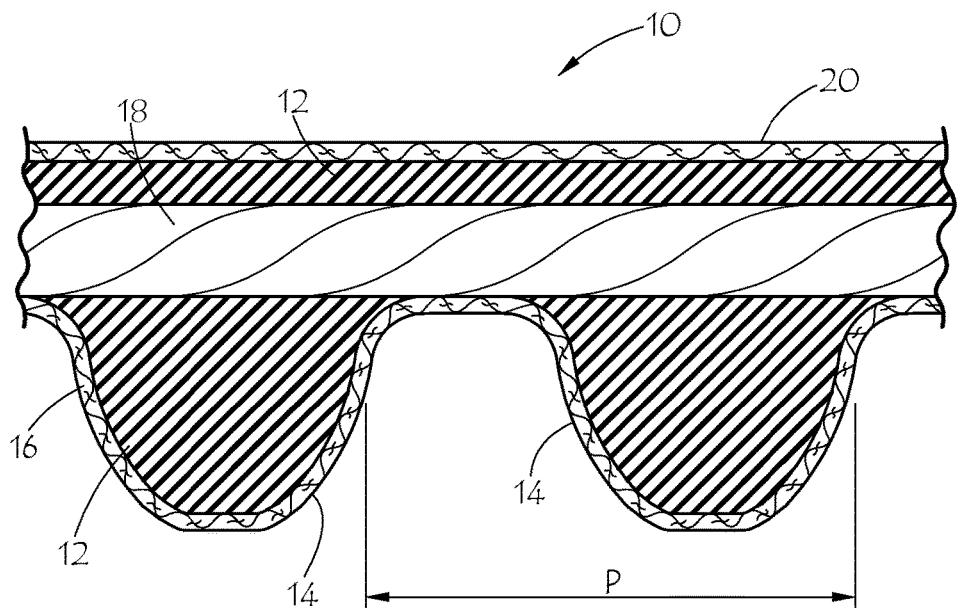
FIG. 1 is a partially fragmented view of a toothed belt according to an embodiment of the invention.

FIG. 1 is a partially fragmented side view of a toothed belt according to an embodiment of the invention. Referring to FIG. 1, the belt 10 of the invention has a body 12 which may be of a rubber belt material with belt teeth 14 formed of the body and spaced apart at a pitch P and located on one side of the belt. The teeth are covered with a wear-resistant fabric 16 disposed along peripheral surfaces of the belt teeth. A tensile member 18 of helically spiraled cord is embedded in the belt body. The back of the belt is smooth and located opposite the toothed side and covered with a special back jacket 20. The back jacket 20 preferably includes a seamless, tubular, knit back fabric made from an elastic yarn and an inelastic yarn fed into a circular knitting machine at the same time but from separate yarn supplies. The back fabric is preferably heat set after knitting. The fabric is preferably treated with a suitable coating after knitting and heat setting. Herein, "fabric" refers to the knit material before adhesives or other suitable coatings are applied, and the treated fabric, ready for use in building a belt or in place on a belt is called "jacket."

The seamless, tubular, knit fabric for the back of the belt can be made from yarns such as cellulosed-based yarns or non-cellulose-based yarns. The cellulose-based yarn or fiber includes natural fiber including cotton, linen, jute, hemp, abaca, and bamboo; man-made fiber including rayon and acetate; and combinations thereof. Non-cellulose-based yarn or fiber includes nylon (polyamide), polyester (PET), polyethylene naphthalate, acrylic, aramid (aromatic polyamide), polyolefin, polyvinyl alcohol, liquid crystal polyester, polyetheretherketone (PEEK), polyimides, polyketone, polytetrafluoroethylene (PTFE), e-PTFE, polyphenylenesulfide (PPS), polybenzobisoxazole (PBO), wool, silk and combinations thereof. Some preferred yarns or fiber types for the back fabric include nylon, cotton, polyester, aramid, polyurethane (PU), and blends of such materials. Nylon includes nylon 6, nylon 66, nylon 46, nylon 11, and the like. The yarns preferably provide a fabric of good flexibility, good resistance to heat aging, and good resistance to oil, water or other environmental exposure or contamination. The yarns may be staple or filament yarns, including monofilament or multi-filament yarns. The yarns may be of any desired twist or blend or wrapped construction. A preferred fabric may be a two-yarn construction including an elastic yarn, such as polyurethane or rubber yarn, with very high elongation or extensibility, combined with another non-elastic yarn, such as a synthetic or natural fiber yarn such as nylon, PET, aramid or cotton or a blended yarn. The elastic and inelastic yarn may be fed separately, i.e., from separate yarn supplies, spools, or let-offs, into the knitting machine to then be combined and knit at the time of making the fabric. The feeding speed and tension for the individual elastic and inelastic yarns can be then separately controlled to achieve a desired level of stretch in the knit tube. A preferred knit fabric is made of nylon yarn and PU yarn fed separately into the knitting machine. The nylon yarn may be nylon 66 or other suitable nylon type. The nylon yarn can be staple yarn or monofilaments or multiple filament yarn.

Furthermore, a three or more yarn construction including an elastic yarn or fiber, a cellulose yarn or fiber, and other yarns, may be used. A third yarn may be selected according to the desired wear resistance. Again, the first yarn is an elastic yarn such as polyurethane, which provides the fabric with a high level of stretchability. The second and third yarn or fibers could consist of a blend of two different types of yarn or fibers, which may be combinations of cellulose yarn or fiber and non-cellulose yarn or fiber, blended in different ratios. The fiber types and ratios may be chosen to provide a desired combination of properties, such as good adhesion and good wear resistance. The ratio of the elastic yarn or fiber to the non-elastic yarn or fiber may be, for example, from 2% to 40% by weight.

The knitting pattern of the tubular back fabric may be any suitable knitting pattern. A seamless knit tube pattern may be made by weft knitting, preferably by circular knitting where the threads run continuously around the fabric. The knit may be a plain knit or a rib knit. Preferably the knit is a close or tight knit with minimal porosity. Preferably the knit back fabric has a rib structure on the inside surface. A 1×1 weft knit tube is one preferred construction. The tightly knit back fabric thus may prevent rubber flow from the belt body through to the outside back surface of the belt. At the same time the rib structure on the inside surface of the knit back fabric may allow good mechanical interaction between the body rubber and the fabric resulting in good adhesion between fabric and rubber. For belts used in contact with oil, it may be preferable to have no rubber penetration or exposure on the belt back surface. The back fabric itself may be more oil resistant than the belt body rubber compound, and preventing oil ingress at the fabric-rubber interface can enhance belt durability in the oil environment.

This knit tube for the back fabric may advantageously be put through a heat set process to make the knit tube shrinkage and/or shape more uniform. During belt building, the knit tube will be applied over a cylindrical mandrel wrapped with belt-building materials for the tooth jacket, belt body and tensile cord. This build-up of belt materials is called the belt slab. The back fabric should fit the slab surface tightly after installation, i.e., with some degree of stretch, and the heat setting may make the fabric stretch more uniform which helps to prevent any abnormal rubber strike-through during molding, thus helping to achieve a more uniform belt back surface appearance, more consistent coefficient of friction (COF), and the like. Also, heat setting has been found to improve oil resistance by preventing oil from passing through the belt back surface. This has particularly shown up in low temperature testing of the belts. Heat setting conditions may be suitably chosen given the thermal properties of the yarns or fibers used to make the fabric. For example, the heat setting may be carried out on heated rollers, or heating may be by infrared or steam heat. If the fabric is washed or dyed, the washing or dyeing is preferably done before heat setting. The heat setting may include pressing or compacting of the fabric. Compacting or pressing alone can be carried out, but it is more preferable to include heat setting, with or without pressing. Compacting may increase the width of the tube, for example, by controlling the speed of the rolls.

Figure 2:
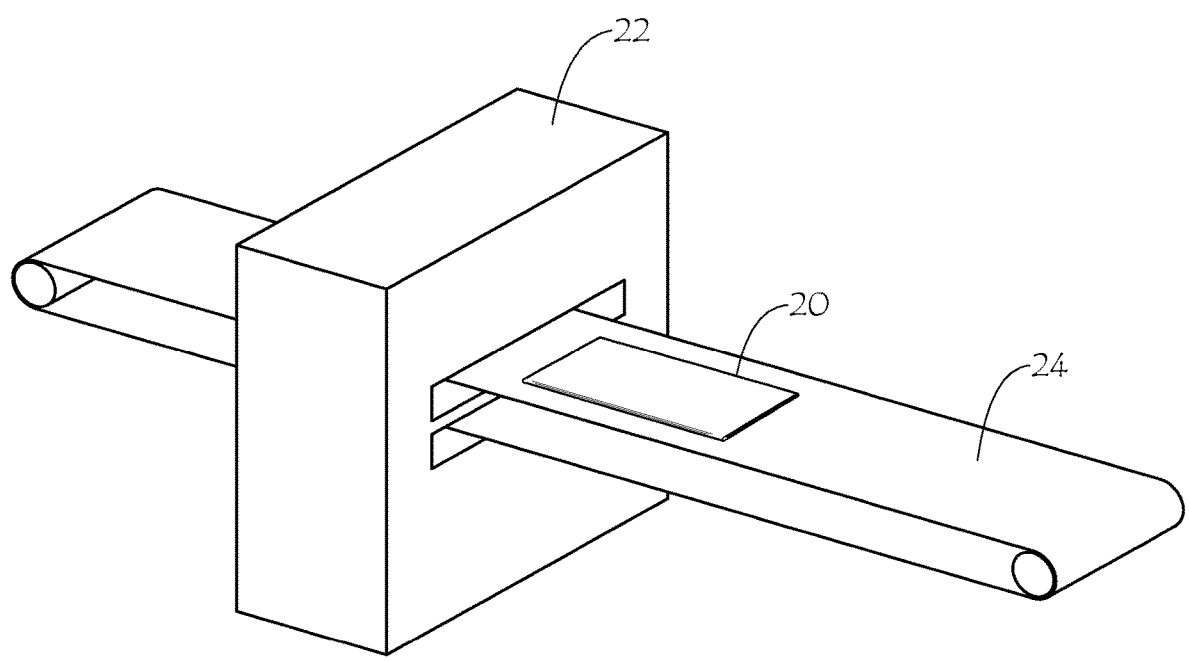
FIG. 2 illustrates a step of a method embodiment of the invention.

The seamless tube for the back fabric may be advantageously used greige (as made, preferably after the heat set) or the greige fabric tube can be coated with a coating or treatment. The knit tube tends to be very stretchable and flexible, making treatment more difficult than conventional woven belt fabrics. One suitable method is to apply a liquid treatment solution directly to the back fabric by dipping, roll-coating, or spraying. The wet fabric may then be dried by placing the fabric on a liner fabric capable of being run thru a conventional continuous fabric drying oven. FIG. 2 illustrates such a drying process. In FIG. 2, a cut length of treated tubular fabric 20 is laid on the support fabric 24 which carries it through continuous oven 22. Alternately, long or continuous lengths of treated tubular fabric can be dried on the support fabric, followed by cutting to a desired length. The back fabric treatment can thus be dried without any stresses on the fabric. Minimizing stresses is important in order to maintain the fabric elongation, the uniformity of shape and knit structure, and the desired width or circumference. A suitable fabric treatment may provide improved adhesion of the fabric to the belt body rubber, reduced strike-through of body rubber, and/or increase the resistance to oil.

It may be noted that another treatment option is to treat the yarns before knitting in order to avoid the problems of treating a very stretchy knit fabric. However, the post-knitting treatment is preferred here because it is thought to provide better fabric integrity and better resistance to rubber strike-through or oil penetration.

Any suitable treatment may be applied to the back fabric. For example, the seamless knit tube can be treated with a resorcinol-formaldehyde-latex (RFL) type coating, an epoxy-based or epoxy+rubber-latex type coating, a rubber cement, or a nano-material-based coating, or combinations of multiple coatings.

Exemplary epoxy and epoxy-latex type treatments are described in U.S. Pat. Pub. No. 2014/0080647 A1, the contents of which are hereby incorporated herein by reference. One or more sequential coatings or treatments may be applied. For example, the epoxy resin may be applied to the facing fabric after it is first subjected to RFL treatment. The epoxy treatment may be applied to one or both sides of the fabric. The epoxy resin included in the epoxy or epoxy-rubber treatment composition may be bisphenol A epoxy resin, bisphenol F epoxy resin, novolak-type epoxy resin, biphenyl-type epoxy resin, phenoxy-type epoxy resin, aliphatic epoxy resin, and the like. One of these epoxy resins alone or a combination of two or more may be used. Bisphenol A epoxy resin or novolak-type epoxy resin is preferred. The epoxy resin preferably has a number average molecular weight of 300 or higher. The epoxy equivalent of the epoxy resin is preferably 150 to 1500 g/eq. Here, the number average molecular weight is a value measured with a gel permeation chromatograph (GPC) and converted into that of polystyrene. The solvent for diluting the epoxy-rubber treatment agent composition may be water, and the epoxy resin may be water-soluble. Organic solvents may be used instead.

The hardener included in the epoxy-rubber treatment composition may be any, as long as the epoxy resin can be hardened thereby. Examples of the hardener include amine-based hardener, acid anhydride-based hardener, phenol novolak-based hardener, imidazole-based hardener, dicyandiamide-based hardener, and the like. One of these hardeners alone or a combination of two or more may be used. For example, an imidazole-based hardener, which is a catalytic hardener, may be preferably used. A catalytic hardener polymerizes the epoxy resin by catalytic direct reaction of epoxy rings. In addition, the hardener may be soluble in water, and dissolved in the treatment liquid as in the case of the epoxy resin. The epoxy resin preferably has three or more functional groups (epoxy groups), so that a network structure may be formed during the hardening or curing process with the hardener.

The rubber component included in an epoxy-rubber treatment composition is not particularly limited, but the rubber component is preferably nitrile rubber (NBR), hydrogenated nitrile rubber (HNBR), or hydrogenated carboxylic nitrile rubber (HXNBR), especially when the rubber body component is also NBR-based, in order to improve the adhesion with the belt body back surface rubber. The rubber may be rubber latex. In other words, NBR latex, HNBR latex, or HXNBR latex is preferably used in the epoxy-rubber treatment.

The tooth covering jacket 16 may be any known construction suitable for the purpose. For example the fabric of the tooth jacket may include a nylon, polyester, PTFE, PEEK, PPS or aramid yarn or combinations thereof, as well as any of the materials mentioned above for the back fabric. The tooth fabric may be woven or knit or nonwoven. The yarns may be textured for stretch. Useful weaves include plain weaves, twills, satins, and the like. The fabric may be oriented with a stretchy direction in the belt longitudinal direction to facilitate tooth formation. The fabric may be oriented on a bias. Some preferred fabrics include a 2×2 twill woven nylon 66 stretch fabric, or an aramid-nylon blend fabric.

The tooth fabric may be treated with any suitable treatment known in the art, including any of the treatments mentioned above for the back fabric. A preferred fabric treatment includes the epoxy or epoxy-rubber treatment, with optional RFL treatment, described in U.S. Pat. Pub. No. 2014/0080647A1 to Yamada et al., which is incorporated herein by reference. Such a treatment is intended to improve the wear resistance and oil- and water-resistance of a tooth facing jacket, and to provide a toothed belt that has satisfactory durability even when used under high-temperature and high-load conditions or within an oil or water environment.

The outer surface of the tooth-facing fabric may be further coated with an oil-resistant or friction-modifying coating, which may contain, for example, one or more of fluororesin, binder, epoxy, curative, latex, and other coating ingredients. Such a coating may be applied to the sides and/or back of the belt as well. Examples of such coatings include those disclosed in U.S. Pat. No. 6,419,775 B1 to Gibson et al., U.S. Pat. No. 8,388,477 B2 to Baldovino et al., the contents of which are hereby incorporated herein by reference.

Any suitable rubber composition(s) may be used for the tooth or belt body rubber 12. In addition, the same or different compounds may be used in the tooth, in the tensile cord layer, and on the back side, as desired. U.S. Pat. No. 6,358,171 B1 to Whitfield, which is hereby incorporated herein by reference, describes exemplary rubber compounds for the tooth rubber or belt body rubber. As described therein the belt body rubber composition may include a nitrile-group containing copolymer rubber such as HNBR and the rubber may include a third monomer which lowers the glass transition of the rubber. The rubber composition may also include from about 0.5 to about 50 parts by weight of rubber (PHR) of a fiber reinforcement. U.S. Pat. No. 9,140,329 B2, which is hereby incorporated herein by reference, describes other exemplary rubber compounds for the tooth rubber or belt body rubber. As described therein, the belt body rubber composition may include HNBR or HXNBR rubber, resorcinol, and a melamine compound.

The rubber composition(s) of the belt body may furthermore include additional ingredients known in the art, such as fillers, plasticizers, anti-degradants, processing aids, curatives, coagents, compatibilizers, and the like.

The tensile cord 18 for the belt may be any known in the art, but preferably comprises fiber glass, PBO, aramid, carbon fiber or a hybrid of two or more. The tensile cord preferably includes an adhesive treatment that is highly resistant to oil for use in oil-wet environments. For example, the adhesive treatment may be based on nitrile-containing latex or rubber, or other oil-resistant materials.

The toothed belts of the invention may be manufactured according to known methods of making belts. The most common approach is to apply the various materials to a grooved mandrel, beginning with the tooth cover jacket, then the tensile cord and body rubber, and ending with the back jacket. The mandrel with the belt slab is then inserted in to a pressurizable shell which can be heated and pressurized to squeeze the materials together, causing the rubber to flow into the teeth grooves pushing the tooth jacket into the shape of the grooves (the "flow-through" method). Alternately, the teeth can be preformed into the approximate groove shape, optionally with rubber filling the teeth, before placing the tooth jacket on the mandrel (the "preform method"). Other variations on these methods are also possible. The primary additional feature for making a fabric-backed belt is that the rubber layers must be carefully measured to obtain the desired final belt thickness, since the back of the belt cannot be ground to size as is done for rubber-backed belts.

Examples

A knit tube according to the invention was prepared using nylon 66 yarn and polyurethane elastic yarn fed into a circular, weft knitting machine. The knitting parameters are indicated in Table 1. After knitting, the tube was washed and heat set with the parameters as indicated in Table 1. The heat setting was done on a two-roll mill with steam heat. Thus, the fabric was also pressed during heat setting.

The knit tube was then cut to length and treated with various adhesive treatments as indicated in Table 2. As a control variable, conventional woven nylon 66 stretch fabric was used. The EP-1 treatment in Table 2 was an epoxy+NBR latex+hardener treatment, applied by dipping and dried on a carrier fabric in a conventional oven at 1.5 m/min and 145-165° C. The EP-2 treatment in Table 2 was the same as EP-1 but with 2-passes through the dipping process, followed by the same drying process. The NBR RFL-1 and -2 treatment was a conventional RFL treatment with NBR latex, also carried out as both a 1-pass treatment and a 2-pass treatment, with a oven speed of 2.5 m/min and at 160-170° C. The VP RFL treatment was a 2-pass treatment using a typical vinylpyridine (VP) latex, dried at 1.7 m/min at 190° C. As indicated by the outside circumference (OC) of the resulting treated tubes, versus the greige tube, in Table 2, the treatment process was able to preserve the tube dimensions in spite of its high stretchability. It can be seen from Table 2 that the warp and weft elongation at specified load of 0.372 Kg on a 25-mm wide fabric sample does decrease with treatment. The treatment thus increases the dimensional stability of the knit tube. The treated fabric in the final form as used in the belt may be referred to as a jacket.

TABLE 2

| Fabric/Jacket parameters | Control[1] | Knit Tube | A1 | A2 | B1 | B2 | C |
|---|---|---|---|---|---|---|---|
| Treatment | EP-1 | Greige | EP-1 | EP-2 | NBR RFL-1 | NBR RFL-2 | VP RFL |
| Jacket OC (mm) | 1350[1] | 943 | 950 | 954 | 964 | 962 | 941 |
| Weft elongation at 0.372 Kg/25 mm (%) | — | 183 | 143 | 47 | 57 | 47 | 113 |
| Warp elongation at 0.372 Kg/25 mm (%) | — | 141 | 140 | 55 | 58 | 47 | 97 |
| Weft elongation at 1 Kg/25 mm (%) | — | — | — | 160 | — | 120 | 220 |
| Warp elongation at 1 Kg/25 mm (%) | — | — | — | 110 | — | 110 | 260 |
| Elongation at break | 59 | — | — | — | — | — | — |
| Weight (g/m$^2$) | 315.5 | 202.7 | 237.5 | 264.8 | 247.3 | 282.0 | 250.7 |
| Thickness (mm) | 0.70 | 0.72 | 0.74 | 0.77 | 0.75 | 0.78 | 0.78 |
| Needle count (C/25 mm) ND-WPI | — | 58 | — | — | — | — | — |
| Warp density (C/25 mm) WD-CPI | — | 94 | — | — | — | — | — |

[1]Woven Nylon 66 fabric of indicated width.

TABLE 1

| | Knit Tube |
|---|---|
| Knit Process Parameters | |
| Knit style | Tubular Weft knitting 1 × 1 |
| Feeding speed | 13 RPM |
| Yarn feed ratio | 22 (Nylon66):8.5 (PU) |
| Yarn content (weight %) | 90% Nylon66 + 10% PU |
| Nylon tension | 5-7 g |
| Post Processing Parameters | |
| Water temperature | 60° C. |
| Wash time | 20 min. |
| Drying temperature | 110-120° C. |
| Drying speed | 7 m/min. |
| Heat Set temperature | 120-130° C. |
| Heat Set speed | 12-13 m/min. |

The control fabric, untreated fabric and treated fabrics of Table 2 were used as the back jacket for the toothed belt examples shown in Table 3. For each of the belts in Table 3, the Control fabric of Table 2 was used as the tooth covering jacket, and HNBR rubber compound was used as the belt body, and a conventional fiberglass tensile cord was used as the tensile member. The belts were made in a conventional way, by first applying the tooth cover jacket to a grooved mandrel, then helically winding on the tensile cord (both S and Z twist), then applying calendered layers of belt body rubber, and finally applying the tubular back fabric. The completed slab, on the grooved mandrel was then cured in a pressurized rubber sleeve using steam heat and pressure to soften the rubber, form the teeth and cure the materials. The cured belt slab was removed from the mandrel and cut into belts of desired width for testing.

In other preliminary series of experiments, belts were constructed with tubular fabrics with various variations in the fabric processing or handling steps. These experiments showed that heat setting was important for reducing unwanted rubber strike through, thus preserving the desired jacket surface on the back of the belt. Also, the best belt appearance, in terms of uniformity and reduced strike-through, was obtained when the heat setting process was done with steam pre-heat and by pressing or compacting between two heated rollers.

Table 3 shows belt properties and test results on the example belts. The jacket adhesion was tested by peeling the jacket away from the back side of the belt, pulling at 180°. It may be noted that other belt properties, not reported, were approximately equivalent for all examples, including cord pullout adhesion, tooth jacket adhesion, tooth shear strength and tensile strength.

In other tests with this knit tube, testing treatments as RFL and Epoxy-Latex treatment, Epoxy-NBR Latex showed better oil resistance than RFL based on NBR latex as well as better cold crack resistance.

Figure 3:
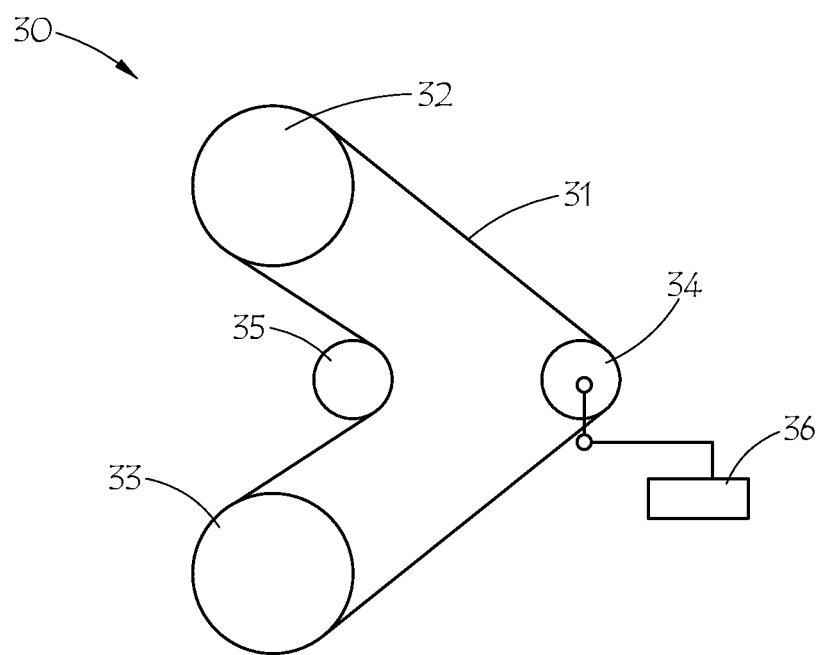
FIG. 3 is a schematic of the Hot/Cold Test method.

The Hot/Cold Test was carried out on the belts as follows. The Hot/Cold Test layout 30 is illustrated in FIG. 3, including driver pulley 33 and driven pulley 32, each having 46 grooves at 8-mm pitch, and smooth 60-mm diameter idler 35, and 57.2-mm diameter tensioning idler 34, under a dead weight tension 36 of 400N. Test belt 31 was 24-mm wide, 8-mm pitch, with 146 teeth. The belt is first conditioned on the tester by running it for 250 hours at 110° C. and 3000 RPM. Then the belt is soaked for 15 hours at –40° C. Then the tests cycles at –40° C. are begun, and continued till cracks or failure are observed, each cycle consisting of running 5 seconds at 300 RPM, then 30 seconds at 2000 RPM, then stopping for 25 minutes. The number of cycles for the first crack to appear is reported in Table 3.

The results of the Hot/Cold Test show that the control belt, Comp. Ex. 1, with no back fabric exhibits back rubber cracks at about 20 cycles. Adding the conventional jacket to the back extends the life of Comp. Ex. 2 to about 60 cycles, when the jacket seam, being a weak spot, initiates a crack. The inventive belts of Ex. 3, Ex. 6, and Ex. 7 shown much improvement, running much longer before cracks appear and having no jacket seam or joint to initiate a seam crack. Ex. 3 and Ex. 7 show twice the life of the seam crack in Comp. Ex. 2. It may be noted that Comp. Ex. 2 exhibited additional cracks away from the seam location at about the same number of cycles as Ex. 3 and Ex. 7.

Figure 4:
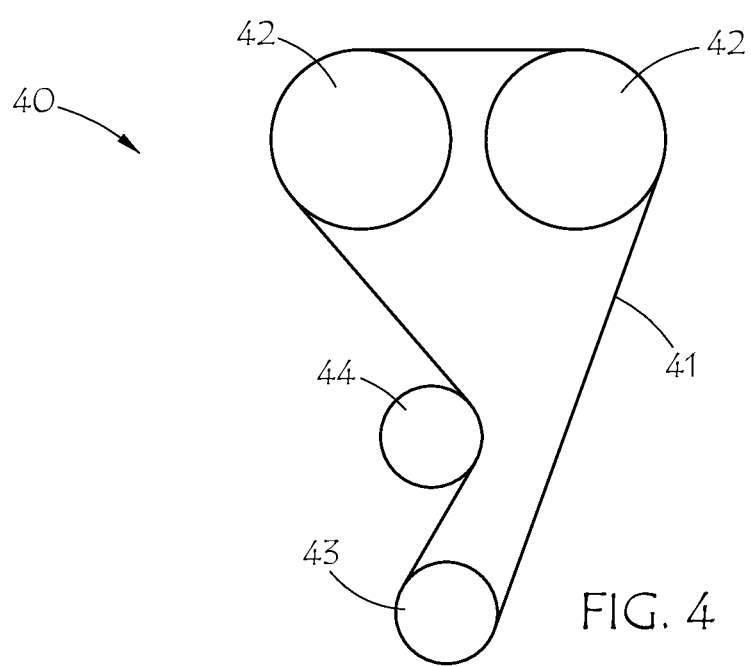
FIG. 4 is a schematic of the Cold Test method.

The Cold Test was carried out on the belts as follows. The Cold Test layout 40 is illustrated in FIG. 4, including 19-groove driver pulley 43 and two 22-groove driven pulleys 42, and smooth 60-mm diameter tensioner 44, under a tension of 400N. Test belt 41 was 10 mm wide, with 116 teeth and a pitch of 9.525 mm. The belt is first soaked for 15 hours at –30° C. Then 100 test cycles at –30° C. are begun, and continued till cracks or failure are observed, each cycle consisting of running 30 seconds at 2000 RPM, then stopping for 25 minutes. The result is reported in Table 3.

TABLE 3

| Belt Properties | Comp. Ex. 1 | Comp. Ex. 2 | Ex. 3 | Ex. 4 | Ex. 5 | Ex. 6 | Ex. 7 |
|---|---|---|---|---|---|---|---|
| Back Jacket | None | Control | A1 | A2 | B1 | B2 | C |
| Back Jacket peel (N) | NT[1] | 96 | 84.3 | 105 | 87 | 121 | 72 |
| Oil resistance | — | o | ++ | ++ | + | + | o |
| Hot/Cold Test | | | | | | | |
| 1$^{st}$ crack (cycles) | 20 | 120[2] | 120 | NT | NT | 80 | 120 |
| crack at joint? | NT | Y | N | | | N | N |
| Cold Test, Cracks at 100 cycles | Y | N | N | NT | NT | Y | N |

[1] NT = Not Tested.
[2] Cracks at cord line appeared at 60 cycles.

Use of conventional Nylon stretch fabric requires making a tube by sewing the edges together with thread, typically with straight sewing joints. Such fabric can reduce the extent of belt backside cracking, but cannot achieve overall better performance because of the weakness of the sewing joints where cracks are most likely to start. The joints may be located over a tooth to minimize severity of cracking, but the joint is still the weakest location and most likely to crack. Likewise, using bias thread-sewn joints (on a diagonal line) also creates a joint for crack initiate, and there is also a higher jacket scrap ratio and more difficult manufacturing process to deal with. On the other hand, seamless tubes can be made without any thread sewing joints. Thus, all positions around the belt will have same integrity and durability, with no weak points as occurs with sewn joints. Seamless tubes made by knitting have good elongation and stretch in all directions, which may also result in better crack resistance than conventional nylon stretch fabric.

Toothed belts with seamless tube back surface according to an embodiment of the invention have good wear resistance and a stable COF, with low frictional loss from belt backside. With a knit construction and suitable treatment, rubber strike through to the back belt surface can be minimized, thus preventing oil migration into the back rubber. The inventive belts thus are suitable for use in oil-wet environments, such as within the crankcase of an internal combustion engine. The inventive belts with suitable choice of rubber materials also exhibit good high temperature and low temperature performance.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A toothed power transmission belt comprising: a rubber belt body with a toothed surface on one side thereof and a smooth back side surface opposite the one side; a tooth jacket covering the toothed surface; a tensile cord embedded in the rubber belt body; and a back jacket on the smooth back side surface; wherein the back jacket comprises a closed-mesh, knit fabric tube, wherein the closed-mesh, knit fabric tube is knitted with an elastic yarn and an inelastic yarn; wherein the back jacket further comprises a coating comprising an epoxy on the closed-mesh, knit fabric tube.

2. The belt of claim 1 wherein the closed-mesh, knit fabric tube is knitted with a separately fed elastic yarn and a separately fed inelastic yarn.

3. The belt of claim 2 wherein the elastic yarn comprises polyurethane and the inelastic yarn comprises nylon.

4. The belt of claim 1 wherein the coating further comprises a latex rubber on the closed-mesh, knit fabric tube.

* * * * *